US012620851B2

(12) United States Patent
Itasaka

(10) Patent No.: US 12,620,851 B2
(45) Date of Patent: May 5, 2026

(54) ROTOR STRUCTURE

(71) Applicant: Mazda Motor Corporation, Hiroshima (JP)

(72) Inventor: Naoki Itasaka, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 239 days.

(21) Appl. No.: 18/408,872

(22) Filed: Jan. 10, 2024

(65) Prior Publication Data

US 2024/0258849 A1 Aug. 1, 2024

(30) Foreign Application Priority Data

Jan. 31, 2023 (JP) ................................. 2023-012994

(51) Int. Cl.
 *H02K 1/27* (2022.01)
 *H02K 1/278* (2022.01)
(52) U.S. Cl.
 CPC ......... *H02K 1/278* (2013.01); *H02K 2213/09* (2013.01)
(58) Field of Classification Search
 CPC ...... H02K 1/278; H02K 2213/09; H02K 1/02; H02K 1/2766; H02K 1/276; H02K 1/28; H02K 21/028; H02K 21/14; H02K 2201/15
 See application file for complete search history.

(56) References Cited

U.S. PATENT DOCUMENTS

2012/0200188 A1* 8/2012 Sano .................... H02K 1/2766
                                                       310/216.106
2020/0259377 A1    8/2020 Gangi et al.

FOREIGN PATENT DOCUMENTS

JP      2021027700 A  *  2/2021
WO      2022096528 A1    5/2022

OTHER PUBLICATIONS

European Patent Office, Extended European Search Report Issued in Application No. 24152293.7, Jul. 24, 2024, 13 pages.

* cited by examiner

*Primary Examiner* — Thomas Truong
(74) *Attorney, Agent, or Firm* — Alleman Hall LLP

(57) ABSTRACT

A rotor having a changeable magnetic force is provided, which includes a rotor core and magnetic pole parts disposed therein. The rotor core includes a flange part opposing a stator, a base part located inward of the flange part, and a connecting part coupling the base part to the flange part. Each magnetic pole part includes a fixed magnetic-force magnet and a variable magnetic-force magnet disposed in the flange part, and a cavity part defined by the connecting part, between the flange part and the base part. By bisecting each fixed magnetic-force magnet in line symmetry into a pair of magnet pieces, an inside coupling part is provided in the flange part. A first pillar part is comprised of outside coupling parts that bridge the flange part and the base part, and are disposed circumferentially inward of the center position of the circumferential width of each magnet piece.

7 Claims, 9 Drawing Sheets

ROTOR STRUCTURE

TECHNICAL FIELD

The art disclosed herein relates to a structure of a rotor which constitutes a drive motor suitable for driving an automobile.

BACKGROUND OF THE DISCLOSURE

In recent years, electrification of automobiles, such as hybrid vehicles and electric vehicles, has progressed. Drive motors mounted on automobiles are required to achieve low-speed but high-torque output when operating at low speeds, and on the other hand, required to achieve high-speed but low-torque output when operating at high speeds. Within such a wide range, the drive motors are required to achieve a stable output.

A permanent magnet synchronous motor is used widely for this kind of drive motor, and in order to output the high torque, a permanent magnet with a powerful magnetic force is incorporated into a rotor. The onboard drive motor uses a battery as its power source, and is driven by an inverter controlling electric current supplied to the drive motor. Therefore, current exceeding the voltage of the battery or the capacity of the inverter cannot be supplied to the drive motor.

Although a counter electromotive force also increases with the increase of the rotational speed, since the current amount is limited, the rotational speed which can be outputted by the drive motor is limited. Therefore, in the control of the drive motor, a magnetic-flux weakening control which weakens an interlinkage flux by supplying a given current to the stator is generally performed. The magnetic-flux weakening control enables the high-speed output exceeding the limitation, but copper loss and iron loss increase.

On the other hand, lately, a drive motor which is able to change the magnetic force of the rotor by using a permanent magnet with a small coercive force (hereinafter, referred to as a "variable magnetic-force motor") has attracted attention. If the magnetic force of the rotor can be changed according to the driving state, increase in the output, improvement in efficiency, etc. of the drive motor can be realized as well as the reduction in the counter electromotive force, and therefore, fuel efficiency and electricity efficiency of the automobile can be improved.

For example, JP2021-027700A discloses a variable magnetic-force motor in which permanent magnets able to change their magnetic force (variable magnetic-force magnets) are attached to the rotor along with permanent magnets not able to change their magnetic force (fixed magnetic-force magnets).

When the drive motor of an automobile is a variable magnetic-force motor, the magnetic force of the rotor changes during operation of the automobile. Therefore, operation scenes in which the motor performance is influenced, such as a scene of increasing the magnetic force of the rotor and a scene of decreasing the magnetic force of the rotor, increase more than in the conventional drive motor in which the magnetic force of the rotor does not change.

Therefore, in order to utilize the variable magnetic-force motor effectively, it is necessary to optimize the structure of the rotor for each of such various operation scenes. For this purpose, it is necessary to devise rotor elements, such as a fixed magnetic-force magnet, a variable magnetic-force magnet, and a cavity. As a result, the number of rotor elements increases, and therefore, it cannot be avoided that the structure of the rotor, such as the layout and the shapes of the elements, become complicated.

In addition, these rotor elements are unevenly distributed in the outer circumferential part of the rotor on which a strong centrifugal force acts when the rotor rotates. Therefore, the percentage of the rotor core which is used as the base structure decreases in the outer circumferential part of the rotor, which is disadvantageous with respect to the strength.

Therefore, in the case of the variable magnetic-force motor, it is not only necessary to devise the rotor element(s), but also necessary to secure the strength so that it can stand against a centrifugal force breakage.

SUMMARY OF THE DISCLOSURE

The disclosed art aims at realization of a structure of a rotor which can be effectively adapted to various operation scenes of a variable magnetic-force motor, and particularly, the art for securing strength of the rotor which would be complicated in connection with the adaptation is disclosed.

The disclosed art relates to a structure of a rotor that constitutes a drive motor and has a changeable magnetic force.

The structure includes a rotor core disposed inside a stator and opposing the stator via a gap, and a plurality of magnetic pole parts disposed in the rotor core so that N-poles and S-poles are lined up alternately in a circumferential direction of the rotor core along an opposing surface. The rotor core includes a flange part opposing the stator and having an annular shape in an axial cross-section, a base part located inward of the flange part and separated from the flange part by a given distance, and a connecting part coupling the base part to the flange part.

Each of the magnetic pole parts includes a fixed magnetic-force magnet elongated in the circumferential direction and disposed in the flange part centering on a d-axis so that a magnetic force thereof is oriented in a radial direction of the rotor core, a variable magnetic-force magnet disposed in a part of the flange part on an opposing surface side of the fixed magnetic-force magnet, at a position adjacent in the circumferential direction to the fixed magnetic-force magnet so that a magnetic force thereof is oriented in the circumferential direction, and a cavity part defined by the connecting part, between the flange part and the base part.

The connecting part includes a first pillar part located radially inward of the fixed magnetic-force magnet. By bisecting the fixed magnetic-force magnet in line symmetry with respect to the d-axis into a pair of magnet pieces, a bar-shaped inside coupling part is provided in a part of the flange part, the part corresponding to a center part of the circumferential width of the fixed magnetic-force magnet, the inside coupling part having an axial cross-section extending in the radial direction. The first pillar part is comprised of a plurality of outside coupling parts that bridge between the flange part and the base part and have a pillar-shape axial cross-section, and the outside coupling parts are disposed circumferentially inward of a center position of a circumferential width of each of the pair of magnet pieces.

That is, since the rotor is disposed inside the stator, when the rotor rotates, a strong centrifugal force acts on the outer circumferential part of the rotor. Therefore, it is necessary to secure the necessarily sufficient strength so that a centrifugal force breakage does not occur, particularly at the flange part of the rotor core which constitutes the outer circumferential part of the rotor.

US 12,620,851 B2

3

In the flange part, the fixed magnetic-force magnet (i.e., the magnet is fixed and not able to change the magnetic force) and the variable magnetic-force magnet (i.e., the magnet has a changeable magnetic force) which constitute each magnetic pole part are disposed. Thus, by magnetizing or demagnetizing the variable magnetic-force magnet, the total magnetic force achieved at each magnetic pole part can be changed in a given range.

When seen in the axial direction, the variable magnetic-force magnet is disposed in a part of the rotor core on the opposing surface side of the fixed magnetic-force magnet, at a position adjacent in the circumferential direction to the fixed magnetic-force magnet. Therefore, the variable magnetic-force magnet is easily influenced by the magnetic field from the stator, and is easily magnetized in the circumferential direction.

By bisecting the fixed magnetic-force magnet into the pair of magnet pieces, the bar-shaped inside coupling part is provided in the part of the flange part corresponding to the center part of the circumferential width of the fixed magnetic-force magnet. The inside coupling part has the axial cross-section extending in the radial direction. Since the fixed magnetic-force magnet is elongated in the circumferential direction, when a large radially-outward load is applied due to the centrifugal force, the accommodating parts may be deformed, and a centrifugal force breakage may occur.

On the other hand, by bisecting the fixed magnetic-force magnet and connecting the center part of the circumferential width of the accommodating part in the flange part with the inside coupling part, the space which is long in the circumferential direction can be bisected, and the load which acts on the fixed magnetic-force magnet can be distributed. Therefore, sufficient strength of the flange part can be secured.

Between the flange part and the base part inward thereof in the rotor core, the cavity part is defined by the connecting part. By widening the cavity part, the weight of the rotor can be decreased, but it decreases the strength of the rotor.

In this regard, according to this rotor, the first pillar part located radially inward of the fixed magnetic-force magnet is comprised of the plurality of outside coupling parts which bridge between the flange part and the base part. Further, the outside coupling parts are disposed circumferentially inward of the center position of the circumferential width of each of the pair of magnet pieces.

From the viewpoint of the strength, it is preferred that the circumferential width of the first pillar parts is widened. However, then the rotor becomes heavier. The first pillar part also functions as a magnetic path. The circumferential width of the first pillar part influences the strength, and it also influences the flow of magnetic flux. If the first pillar part is too narrow, the magnetic flux generated by the fixed magnetic-force magnet is reduced because of the influence of the magnetic saturation of the first pillar part, but the magnetic field from the stator acts easily on the variable magnetic-force magnet. If the first pillar part is too wide, the magnetic flux generated by the fixed magnetic-force magnet is increased until the magnetic saturation of the first pillar part is canceled, but the magnetic field from the stator becomes difficult to act on the variable magnetic-force magnet. Thus, a suitable circumferential width of the first pillar part is determined by the magnetic flux flow. Therefore, the first pillar part is comprised of the plurality of outside coupling parts which are suitably adjusted in the width.

The magnetic flux of the fixed magnetic-force magnet is stronger on the center side of the d-axis. Therefore, if the outside coupling part is disposed at a position distant from the d-axis, the function as a magnetic path is reduced. Further, since the fixed magnetic-force magnet is bisected centering on the d-axis, the magnetic path is more preferred to be located at a position which is eccentric to both sides of the d-axis rather than the center of the d-axis. Thus, as described above, the outside coupling parts are disposed. As a result, since the magnetic flux of the fixed magnetic-force magnet becomes easier to flow into the outside coupling parts, the function as the magnetic path of the first pillar parts can be secured.

The first pillar part receives most of the radially-outward load applied to the inside coupling part when the rotor rotates. On the other hand, since the outside coupling parts are disposed at the positions which are spread in the circumferential direction from the inside coupling part, they can distributively receive the load substantially equally.

Therefore, even when the width of each outside coupling part is narrow, it can receive the load applied to the inside coupling part, and further, the width may be suitable as a whole.

For example, the first pillar part may be comprised of two outside coupling parts, and the center position of the circumferential width of each of the outside coupling parts may be located on the d-axis side of the center position of the circumferential width of each of the pair of magnet pieces.

Thus, the two outside coupling parts correspond to the pair of magnet pieces so that the first pillar parts become more appropriate.

Each of the variable magnetic-force magnets may be disposed at a position centering on a q-axis. The connecting part may include a second pillar part having a pillar shape in the axial cross-section, and the second pillar part may be located in a part radially-inward of the variable magnetic-force magnet and bridge between the flange part and the base part.

If a large cavity is formed in the rotor core at the part of the q-axis, the strength will be insufficient and it will be easy to cause the centrifugal force breakage. On the other hand, by providing the second pillar part also to the part of the q-axis, the strength of the rotor core can be further improved.

The second pillar part may have a wider circumferential width than that of the variable magnetic-force magnet. By including a nonmagnetic material extending along the second pillar part in a part radially inward of the variable magnetic-force magnet, a pair of coupling arm parts having a bar shape in the axial cross-section may be formed, the pair of coupling arm parts being located at both sides of the nonmagnetic material, circumferentially outward of the variable magnetic-force magnet.

Each coupling arm part collaborates with the first pillar parts to receive from circumferentially outward the load applied to the part where the fixed magnetic-force magnet, etc. are disposed. Therefore, since the load can be distributed effectively, the strength of the rotor can be improved structurally. Each coupling arm part constitutes the magnetic path. Therefore, the second pillar part also functions as the magnetic path which connects the flange part to the base part.

The nonmagnetic material with the larger circumferential width than the first variable magnetic-force magnet is disposed in a part radially inward of the first variable magnetic-force magnet. As the nonmagnetic material, light materials, such as synthetic resin, may be used. Therefore, when the centrifugal force acts, it pushes the first variable magnetic-force magnet radially outward with a moderate load. Therefore, the ejection of the first variable magnetic-force magnet can be suppressed.

DETAILED DESCRIPTION OF THE DISCLOSURE

Hereinafter, the disclosed art is described. However, the following description is merely illustration essentially. The disclosed art relates to a structure of a rotor which has a changeable magnetic force. It is particularly suitable for a drive motor which drives an automobile. Therefore, in this embodiment, one example of application to an onboard drive motor is illustrated.

<Automobile which Travels by Drive Motor>

Figure 1:
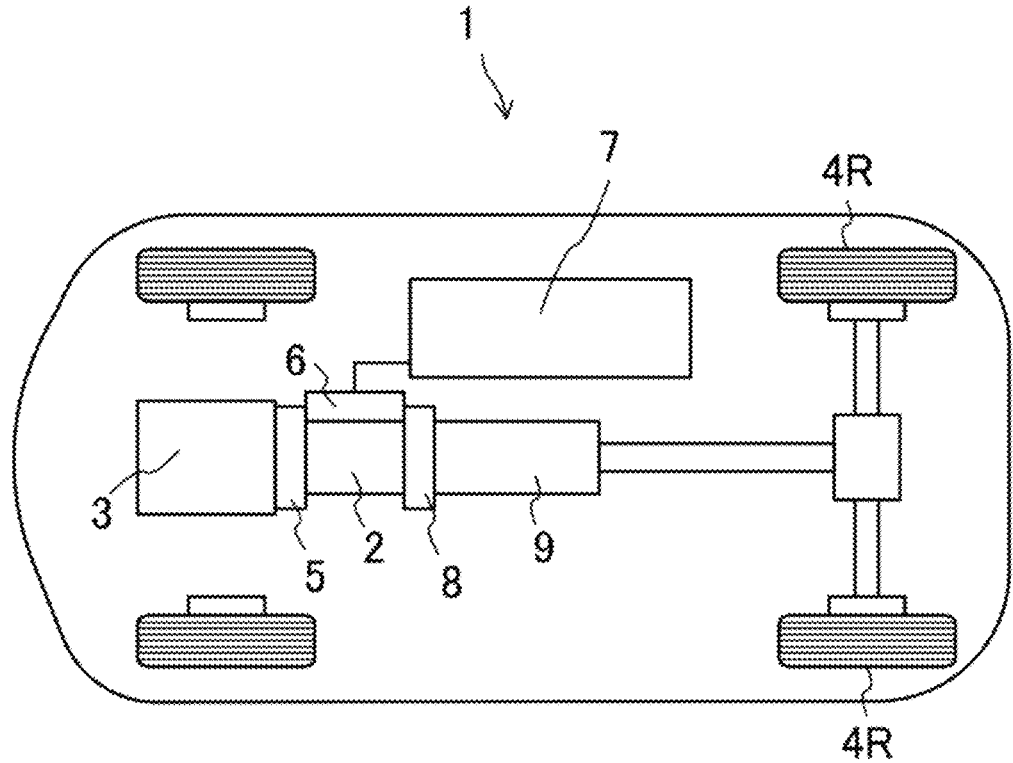
FIG. 1 is a view illustrating an automobile to which the disclosed art is applied.

FIG. 1 illustrates an automobile 1 which travels by a drive motor. This automobile 1 is a hybrid vehicle. As a drive source of the automobile 1, an engine 3 is mounted thereon, in addition to a drive motor 2 (variable magnetic-force motor) to which the art to disclose is applied. These collaboratively rotate two driving wheels 4R. Therefore, the automobile 1 travels.

In the case of this automobile 1, the engine 3 is disposed at the front side of the vehicle body, and the driving wheels 4R are disposed at the rear side of the vehicle body. That is, this automobile 1 is referred to as "FR (front-engine, rear wheel drive) vehicle." Further, the engine 3 is mainly used as the drive source of this automobile 1, and the drive motor 2 is used to assist the drive of the engine 3 (referred to as "mild hybrid"). The drive motor 2 is also used as a power generator (referred to as "regenerator").

The engine 3 is an internal combustion engine which combusts using gasoline as fuel, for example. The engine 3 may be a diesel engine which uses diesel oil as fuel. The drive motor 2 is coupled to the rear of the engine 3 via a first clutch 5. The drive motor 2 is a permanent magnet synchronous motor which is driven by three-phase alternate current.

However, this drive motor 2 is a variable magnetic-force motor, as described above. Its rotor is provided with a fixed magnetic-force magnet 40 and a variable magnetic-force magnet 50 which will be described later so that the magnetic force is changeable. The structure of the rotor is devised to improve the motor performance (the details will be described later).

The drive motor 2 is coupled to a drive battery 7 via an inverter 6. The drive battery 7 is comprised of a plurality of lithium-ion batteries. The rated voltage of the drive battery 7 is less than 50 V (in detail, 48 V). The drive battery 7 supplies direct current power to the inverter 6. The inverter 6 converts the direct current power into the three-phase alternate current with different phases, and supplies it to the drive motor 2. Therefore, the drive motor 2 rotates.

A transmission 9 is coupled to the rear of the drive motor 2 via a second clutch 8. The transmission 9 is a multi-stage automatic transmission (referred to as "AT"). A rotational motive force outputted from the engine 3 and/or the drive motor 2 is outputted to the transmission 9 through the second clutch 8. The transmission 9 is coupled to a differential gear via a propeller shaft.

The differential gear is coupled to the left and right driving wheels 4R via a pair of driving shafts. When the automobile 1 is propelled (powering), the rotational motive force which is changed in the speed by the transmission 9 is distributed by the differential gear, and the distributed forces are transmitted to the respective driving wheels 4R.

When the automobile 1 slows down (regeneration), energy consumed by the drive motor 2 is recovered. In detail, when the automobile 1 brakes, the first clutch 5 is released while connecting the second clutch 8. Thus, the rotational motive force from the driving wheels rotates the drive motor 2 to generate electricity. This electric power is charged to the drive battery 7 to collect energy.

<Improvement in Fuel Efficiency>

In the case of the hybrid vehicle, since the engine 3 is mainly used when powering, the influence of the drive motor 2 on the fuel efficiency is small. On the other hand, since the drive motor 2 is mainly used when regenerating, the influence of the drive motor 2 on the fuel efficiency is large.

Since the automobile 1 slows down very often, the energy consumed during slowdown is large. Therefore, for the improvement in the fuel efficiency of the hybrid vehicle, it is important to increase the rate of the energy recovery during regeneration.

For that purpose, an increase in the output of the drive motor 2 is effective, and, accordingly, it is effective to enable the change in the magnetic force of a rotor 30 of the drive motor 2 (i.e., to adopt the variable magnetic-force motor as the drive motor 2). It becomes possible to optimize the power factor in a wide operating range if the drive motor 2 is the variable magnetic-force motor, and therefore, the drive motor 2 becomes high in the output.

In addition, by optimizing the power factor (i.e., making the electromagnetic force outputted from a stator 10 substantially in agreement with the magnetic force outputted from the rotor 30), the high output of the drive motor 2 can be achieved. On the other hand, in the case of a normal permanent-magnet synchronous motor, the magnetic force of the rotor 30 is constant. Therefore, the power factor can be optimized only in a part of the operating range.

On the other hand, since the magnetic force of the rotor 30 can be changed if it is a variable magnetic-force motor, the power factor can be optimized in the wide operating range. In addition, if the power factor can be optimized in the wide operating range, the drive motor 2 can achieve the high output. Further, since increased efficiency may also be realized by making improvements, the fuel efficiency of the automobile 1 can be improved.

<Operating Range of Drive Motor>

Figure 2:
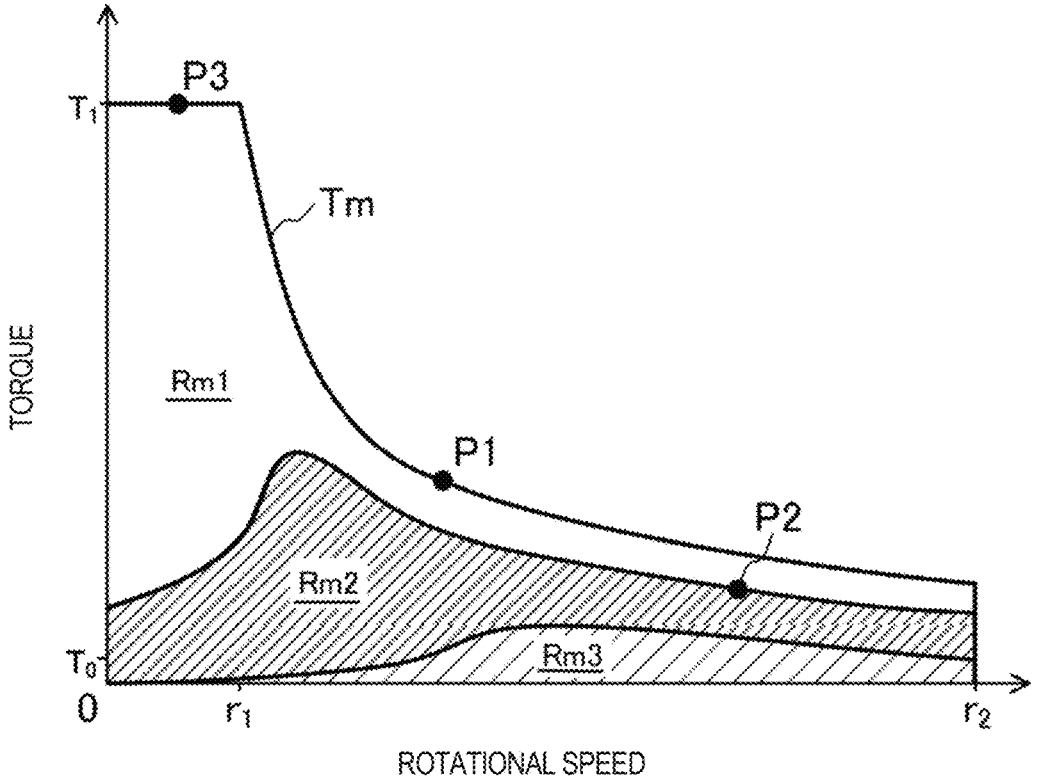
FIG. 2 is a map illustrating an operating range of a drive motor.

FIG. 2 illustrates a map where the operating range of the drive motor 2 is indicated. In this map, the operating range which can be outputted by the drive motor 2 is defined by a load upper limit line Tm indicating an upper limit value of torque (load) at each rotational speed.

In detail, in a low-speed range up to a given engine speed $r_1$, the upper limit of the torque is held at a maximum torque $T_1$. In a middle-speed range and a high-speed range where the engine speed is higher than the low-speed range, the upper limit of the torque is gradually decreased until the engine speed reaches an upper limit $r_2$. The operating range of the variable magnetic-force motor is divided into a plurality of magnetizing areas according to the magnetic force of the rotor 30 so that the power factor is optimized. In the illustrated map, it is divided into three magnetizing areas.

That is, it is divided into a first magnetizing area Rm1 which includes the maximum torque $T_1$ and extends on the high-load side along the load upper limit line, a second magnetizing area Rm2 which extends on the low-load side of the first magnetizing area Rm1, and a third magnetizing area Rm3 which extends on the low-load side of the second magnetizing area Rm2 and includes a torque $T_0$ at which the drive motor 2 idles at the high-speed side (a torque which does not contribute to traveling of the automobile 1).

As for these magnetizing areas, optimal magnetic forces corresponding to respective outputs are set. Normally, the magnetic force of the first magnetizing area Rm1 is larger than the magnetic force of the second magnetizing area Rm2, and the magnetic force of the third magnetizing area Rm3 is set smaller than the magnetic force of the second magnetizing area Rm2.

The magnetizing area is estimated based on the operating state of the drive motor 2 while the automobile 1 travels, and when transitioning through the magnetizing area, the magnetic force of the rotor 30 is changed according to the magnetic force of the corresponding magnetizing area. For example, when transitioning from the second magnetizing area Rm2 to the first magnetizing area Rm1, the drive motor 2 is magnetized. When transitioning from the second magnetizing area Rm2 to the third magnetizing area Rm3, the drive motor 2 is demagnetized.

Although the details will be described later, when magnetizing or demagnetizing, a large pulse-shaped current is supplied to given coils 12 at a timing when the rotor 30 becomes at a given position with respect to the stator 10. Thus, a strong magnetic field is generated from the stator 10 to the variable magnetic-force magnet 50 which is a target to be processed. Therefore, the variable magnetic-force magnet 50 is magnetized until a given magnetic force is obtained.

The direction of the magnetic field generated is opposite between magnetizing and demagnetizing. In magnetizing, magnetization is performed so that the magnetic force of the variable magnetic-force magnet 50 is oriented in the same direction as the magnetic force of the fixed magnetic-force magnet 40. In demagnetizing, magnetization is performed so that the magnetic force of the variable magnetic-force magnet 50 is oriented in the opposite direction to the magnetic force of the fixed magnetic-force magnet 40. Depending on the magnetization state, the direction of the magnetic force of the variable magnetic-force magnet 50 can be reversed, or changed in the magnitude of the magnetic force.

However, magnetization is limited by onboard apparatuses. That is, in order to magnetize the magnetic force of the variable magnetic-force magnet 50 strongly, it is necessary to supply large current to the drive motor 2, and therefore, magnetization is limited by the voltage of the drive battery 7 and the capacity of the inverter 6.

Although increasing the sizes of these apparatuses may be considered, it is difficult to increase the sizes because they are mounted on the vehicle. Therefore, according to the art disclosed herein, the structure of the drive motor 2 (particularly, the structure of the rotor 30) is devised so that magnetization can be conducted appropriately under the limited condition using the existing apparatuses.

<Structure of Drive Motor>

Figure 3:
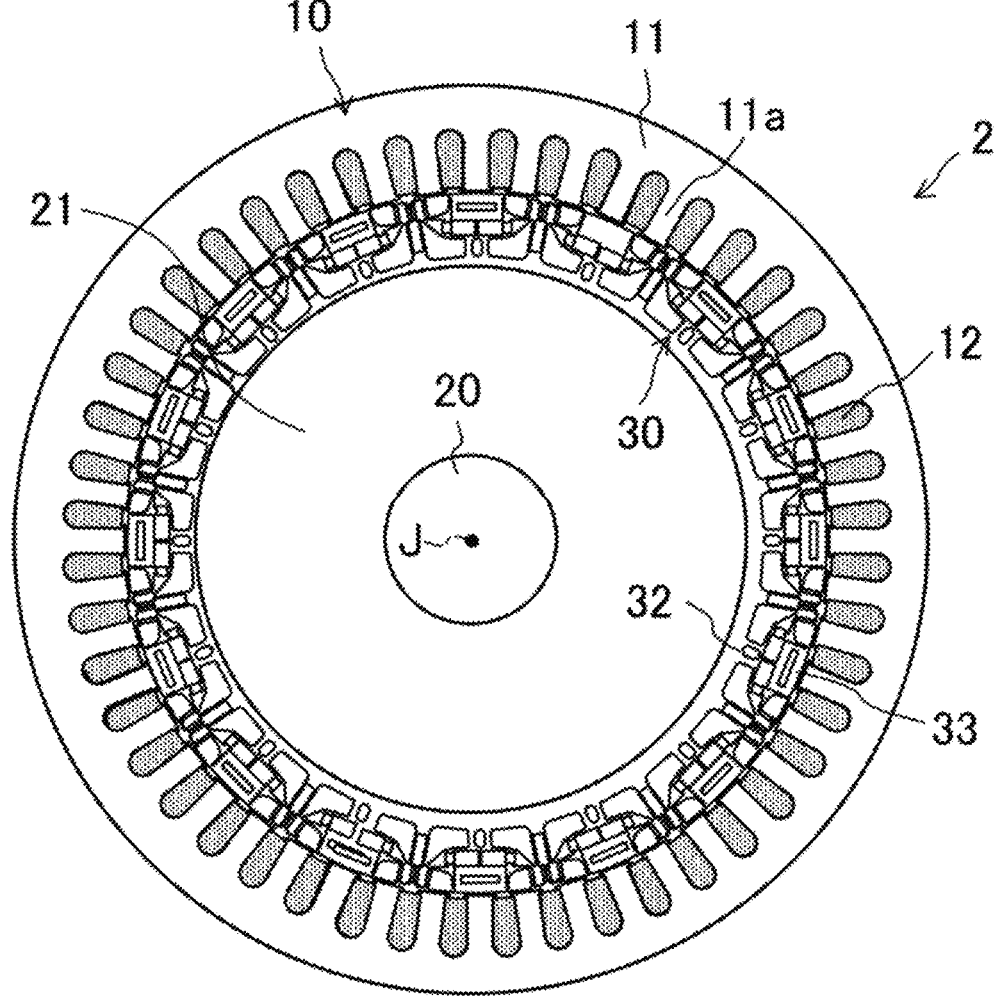
FIG. 3 is a view illustrating a cross-sectional structure of the drive motor.

FIG. 3 illustrates a cross-sectional structure of the drive motor 2 when seen in the axial direction. The illustrated drive motor 2 is comprised of the stator 10, the rotor 30, a shaft 20, and a hub 21. Note that in the following description, a "rotation axis direction" or an "axial direction" indicates a direction in which a rotation axis J extends. The radial direction indicates a direction of a radius centering on the rotation axis J. A "circumferential direction" indicates a direction of the circumference centering on the rotation axis J.

The stator 10 is comprised of a cylindrical member, and is accommodated in a motor case (not illustrated) which is fixed to the vehicle body of the automobile 1. The stator 10 has a stator core 11 with an annular shape in the axial cross-section, and a plurality of coils 12. The stator core 11 is constituted by laminating in the axial direction a plurality of steel plates with high magnetic permeability. The coil 12 is constituted by winding electric wires around the stator core 11.

In detail, a plurality of (48) teeth 11a which protrude radially inward at regular intervals are provided to the stator core 11. The plurality of coils 12 are formed by winding electric wires in spaces (slots) formed between the teeth 11a in given order. These coils 12 constitute a three-phase coil group which is comprised of U-phase, V-phase, and W-phase, which differ in the phase of electric current which flows therethrough. The coils 12 of the phases are disposed in the order in the circumferential direction.

The rotor 30 is comprised of a member with an annular shape in the axial cross-section, and is disposed inside the stator 10 (referred to as "inner rotor type"). An outer circumferential surface 30a of the rotor 30 opposes to an inner circumferential surface of the stator 10 via a gap 31 (see FIG. 4). The rotor 30 has a rotor core 32 with an annular shape in the axial cross-section, and a plurality of (16) magnetic pole parts 33 comprised of N-poles and S-poles which are provided so that the magnetic force is oriented radially outward.

The rotor core 32 is comprised of a member with the annular shape in the axial cross-section which opposes to the stator 10 via the gap 31, and is constituted by laminating in the axial direction a plurality of steel plates with high magnetic permeability. The magnetic pole parts 33 are disposed so that the N-poles and the S-poles are lined up alternately in the circumferential direction along an outer circumferential surface 30a of the rotor core 32 (the same as the outer circumferential surface of the rotor 30, which may also be referred to as "the opposing surface 30a").

Note that although in this embodiment the drive motor 2 with 16 poles and 48 slots is illustrated, the slot combination of the drive motor 2 is not limited to this configuration. For example, the slot combination may be constituted by the magnetic poles of a multiple of two (2N), and the slots of a multiple of three (3M) (here, N and M are integers). Particularly, when mounting it on a vehicle, it is preferred to set the number of magnetic poles within a range of 8 or more and 20 or less, because of the motor size, the demanded output, and limitations of the structure of the rotor 30 (described later).

The rotor 30 is integrated with the shaft 20 which is supported pivotally by the motor case via the hub 21. Therefore, the rotor 30, the hub 21, and the shaft 20 are constituted rotatably centering on the rotation axis J.

(Details of Rotor Structure)

Figure 4:
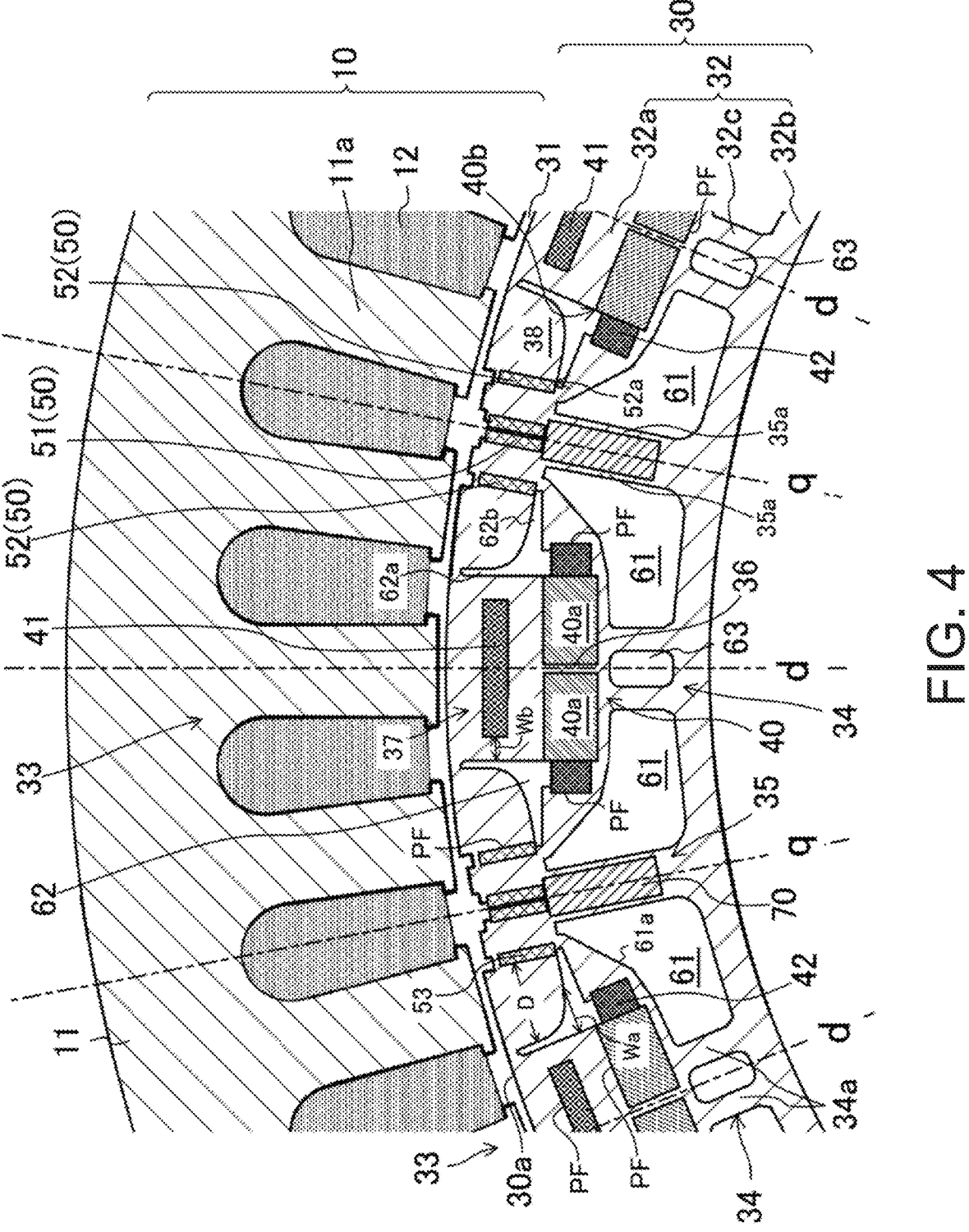
FIG. 4 is a view in which a part of a magnetic pole part in FIG. 3 is enlarged.

FIG. 4 illustrates a view in which a part of the magnetic pole part 33 in FIG. 3 is enlarged. A line which radially extends from the rotation axis J and passes through the center of each magnetic pole part 33 in the circumferential direction indicates a d-axis. A line which extends radially from the rotation axis J and passes through the center between two adjacent magnetic pole parts 33 indicates a q-axis.

The rotor core 32 is comprised of a flange part 32a, a base part 32b, and a connecting part 32c. The flange part 32a is a part with an annular shape in the axial cross-section, which opposes to the stator 10. The base part 32b is a part with an annular shape in the axial cross-section, which is fixed to the hub 21. The base part 32b is separated from the flange part 32a with a given distance therebetween, and is located inward of the flange part 32a. The flange part 32a and the base part 32b are connected together by the connecting part 32c.

The connecting part 32c includes a plurality of first pillar parts 34 and a plurality of second pillar parts 35. In detail, the first pillar part 34 is provided for every d-axis. The second pillar part 35 is provided for every q-axis. By being defined by the connecting part 32c, a plurality of cavity parts (a first cavity part 61 and a third cavity part 63 which will be described later) are formed in a part between the flange part 32a and the base part 32b in the rotor core 32.

Each magnetic pole part 33 is comprised of the fixed magnetic-force magnet 40, a first auxiliary fixed magnetic-force magnet 41 (auxiliary fixed magnetic-force magnet), a second auxiliary fixed magnetic-force magnet 42, the variable magnetic-force magnet 50, and the cavity parts. The variable magnetic-force magnet 50 includes a first variable magnetic-force magnet 51 and a second variable magnetic-force magnet 52. The cavity part includes the first cavity part 61, a second cavity part 62, and the third cavity part 63.

The fixed magnetic-force magnet 40, the first auxiliary fixed magnetic-force magnet 41, and the second auxiliary fixed magnetic-force magnet 42 are magnets in which the residual magnetic flux density of the magnetic body is unchangeable (i.e., the magnetic force is constant and does not change), similarly to a conventional permanent magnet. A magnet with high magnetic flux density and large coercive force, such as a neodymium magnet, is used for the fixed magnetic-force magnet 40. These fixed magnetic-force magnets 40 may be different magnetic bodies, but in this rotor 30, the same magnetic bodies are used.

On the other hand, the variable magnetic-force magnet 50 is a magnet in which the residual magnetic flux density of the magnetic body is changeable (i.e., the magnetic force is changeable). A magnet with high flux density but small coercive force, such as an alnico magnet, is used for the variable magnetic-force magnet 50. The first variable magnetic-force magnet 51 and the second variable magnetic-force magnet 52 may be different magnetic bodies, but, in this rotor 30, the same magnetic bodies are used.

Therefore, with large current (for example, 750 Arms) which is outputtable from the drive battery 7 and the inverter 6, the fixed magnetic-force magnet 40 cannot be magnetized, but the variable magnetic-force magnet 50 can be magnetized and its magnetic force can be changed. Note that the variable magnetic-force magnet 50 can hardly be magnetized with current when normally driving the drive motor 2. Therefore, the variable magnetic-force magnet 50 also functions as a permanent magnet.

The fixed magnetic-force magnet 40 is an element used as the main body of each magnetic pole part 33, and its magnetic force is the strongest. The axial cross-section of the fixed magnetic-force magnet 40 is formed in a rectangular shape in which the long side is sufficiently larger than the short side (for example, doubled or more, and 5 times or less). The side surfaces on the long side of the fixed magnetic-force magnet 40 constitute magnetic pole surfaces PF which are comprised of an S-pole and an N-pole through which a magnetic flux pass. The fixed magnetic-force magnet 40 is disposed on the center side of the flange part 32a in a state where the magnetic pole surfaces PF are oriented perpendicular to the d-axis so that the magnetic force is oriented in the radial direction centering on the d-axis.

The fixed magnetic-force magnet 40 which is long in the circumferential direction is bisected in line symmetry with respect to the d-axis. That is, the fixed magnetic-force magnet 40 is comprised of a pair of magnet pieces 40a located in line symmetry with respect to the d-axis. Therefore, a part of the flange part 32a at the center of the circumferential width of the fixed magnetic-force magnet 40 is provided with a bar-shaped part in which the axial cross-section extends in the radial direction (an inside coupling part 36 which is a part of the rotor core 32).

The first auxiliary fixed magnetic-force magnet 41 is an auxiliary element of each magnetic pole part 33, and has a function to reinforce the magnetic force of the fixed magnetic-force magnet 40. Its magnetic force is the second strongest subsequently to the fixed magnetic-force magnet 40. The axial cross-section of the first auxiliary fixed magnetic-force magnet 41 is formed in a rectangular shape in which both the short side and the long side are smaller than the fixed magnetic-force magnet 40. The side surfaces on the long side of the first auxiliary fixed magnetic-force magnet 41 also constitute the magnetic pole surfaces PF.

The first auxiliary fixed magnetic-force magnet 41 is disposed in a part of the flange part 32a between the opposing surface 30a and the fixed magnetic-force magnet 40 in a state where the magnetic pole surfaces PF are oriented perpendicular to the d-axis, similarly to the fixed magnetic-force magnet 40. The magnetic pole surfaces PF (N-pole or S-pole) of the first auxiliary fixed magnetic-force magnet 41 and the fixed magnetic-force magnet 40, which are lined up in the radial direction, are oriented in the same direction so that the magnetic force of the fixed magnetic-force magnet 40 is reinforced.

The second auxiliary fixed magnetic-force magnet 42 is an auxiliary element of each magnetic pole part 33, and has a function to guide the magnetic flux of the fixed magnetic-force magnet 40. Two second auxiliary fixed magnetic-force magnets 42 are provided to each magnetic pole parts 33. Unlike the fixed magnetic-force magnet 40, the axial cross-section of the second auxiliary fixed magnetic-force magnet 42 is formed in a rectangular shape in which the long side is slightly longer than the short side. The magnetic pole surfaces PF of the second auxiliary fixed magnetic-force magnet 42 are comprised of the long-side side surfaces.

Each second auxiliary fixed magnetic-force magnet 42 is disposed in an end part of the fixed magnetic-force magnet 40 so that an end surface on the long side which constitutes the magnetic pole surface PF contacts an end surface of the fixed magnetic-force magnet 40 in the circumferential direction. The second auxiliary fixed magnetic-force magnets 42 are disposed in line symmetry with respect to the d-axis.

(Variable Magnetic-Force Magnet)

The variable magnetic-force magnet 50 is disposed in a part of the flange part 32*a* on the opposing surface 30*a* side of the fixed magnetic-force magnet 40, and at a position which is adjacent to the fixed magnetic-force magnet 40 in the circumferential direction.

The variable magnetic-force magnet 50 is an element which collaborates with the fixed magnetic-force magnet 40 as the main body of each magnetic pole part 33, and its magnetic force is changeable. The maximum magnetic force of the variable magnetic-force magnet 50 is set equivalent to or below the total magnetic force of the fixed magnetic-force magnet 40 and the first auxiliary fixed magnetic-force magnet 41.

The variable magnetic-force magnets 50 are disposed at positions centering on the q-axis. As described above, the variable magnetic-force magnet 50 includes the first variable magnetic-force magnet 51 and the second variable magnetic-force magnet 52. The center of the circumferential width of the first variable magnetic-force magnet 51 is located on the q-axis. The second variable magnetic-force magnets 52 are provided on both sides of the first variable magnetic-force magnets 51 in the circumferential direction, and are disposed adjacent to the first variable magnetic-force magnets 51.

The first variable magnetic-force magnet 51 and the second variable magnetic-force magnet 52 are comprised of the same magnetic material pieces 53. The axial cross-section of the magnetic material piece 53 is formed in a rectangular shape in which the long side is sufficiently larger than the short side (about 5 times). The length of the long side of the magnetic material piece 53 is substantially the same as the length of the short side of the fixed magnetic-force magnet 40. The first variable magnetic-force magnet 51 and the second variable magnetic-force magnet 52 are sufficiently smaller in the thickness of the axial cross-section than the fixed magnetic-force magnet 40.

A long-side side surface of the magnetic material piece 53 constitutes the magnetic pole surface PF. The magnetic pole surface PF of each magnetic material piece 53 faces in the circumferential direction so that the magnetic force is oriented in the circumferential direction. The first variable magnetic-force magnet 51 is constituted by abutting two magnetic material pieces 53 so that the magnetic material pieces 53 are lined up in the circumferential direction. The second variable magnetic-force magnet 52 is constituted by disposing one magnetic material piece 53 parallel to the first variable magnetic-force magnet 51.

(Cavity Part)

The first cavity part 61 and the third cavity part 63 are formed between the flange part 32*a* and the base part 32*b* by being defined by the connecting part 32*c*, as described above. The second cavity part 62 is formed in the flange part 32*a*.

In detail, the first pillar part 34 is comprised of a plurality of (in the illustration, 2) parts (outside coupling parts 34*a*) located radially inward of the fixed magnetic-force magnet 40. Each outside coupling part 34*a* is provided between the flange part 32*a* and the base part 32*b*, and is formed in a pillar shape in which the axial cross-section extends in the radial direction.

The outside coupling parts 34*a* are disposed in line symmetry with respect to the d-axis in a state where they are separated from each other by a given distance. The third cavity part 63 is formed between these outside coupling parts 34*a*. The third cavity part 63 has a substantially rectangular shape in the axial cross-section, which extends along the d-axis.

The second pillar part 35 is provided between the flange part 32*a* and the base part 32*b* so that it is located radially inward of each variable magnetic-force magnet 50. The axial cross-section of the second pillar part 35 is formed in a pillar shape which extends in the radial direction. The second pillar part 35 is longer in the radial direction than the first pillar part 34. The circumferential width of the second pillar part 35 is larger than that of the first variable magnetic-force magnet 51. The center of the circumferential width of the second pillar part 35 is located on the q-axis.

The second pillar part 35 includes a synthetic resin 70 (nonmagnetic material). That is, the synthetic resin 70 which extends along the second pillar part 35 is embedded in a part of the second pillar part 35 radially inward of the first variable magnetic-force magnet 51. The axial cross-section of the synthetic resin 70 is formed in a rectangular shape in which the circumferential width is slightly smaller than that of the second pillar part 35.

Therefore, in parts of the second pillar part 35 on both sides of the synthetic resin 70, a pair of bar-shaped parts in the axial cross-section (coupling arm parts 35*a* each of which is a part of the rotor core 32) are formed, which are located radially outward of the first variable magnetic-force magnet 51. Note that the bar shape means that the width is narrower than the pillar shape.

The first cavity part 61 is formed between the first pillar parts 34 and the second pillar part 35. That is, both sides of the first cavity part 61 in the circumferential direction are defined by the first pillar parts 34 and the second pillar part 35, and the radially inside part of the first cavity part 61 is defined by the base part 32*b*. Two first cavity parts 61 are formed in each magnetic pole part 33 in line symmetry with respect to the d-axis. The radially outward part of the first cavity part 61 is defined by a curved surface 61*a* which extends from a radially outward end part of the first pillar parts 34 to a radially outward end part of the second pillar part 35.

The curved surface 61*a* is formed so that it is located close to the fixed magnetic-force magnet 40 and the second auxiliary fixed magnetic-force magnet 42, and extends along the fixed magnetic-force magnet 40 and the second auxiliary fixed magnetic-force magnet 42. The curved surface 61*a* has an arc shape which bulges radially inward when seen in the axial direction. The axial cross-section of the first cavity part 61 is large. The rotor core 32 is reduced in the weight by the first cavity part 61.

The second cavity part 62 is disposed in a part of the flange part 32*a* between the fixed magnetic-force magnet 40 and the variable magnetic-force magnet 50 when seen in the axial direction. Two second cavity parts 62 are formed in each magnetic pole part 33 in line symmetry with respect to the d-axis. The axial cross-section of the second cavity part 62 is formed so that it extends from an end part 40*b* of the fixed magnetic-force magnet 40 (in detail, a corner part located radially outward in the fixed magnetic-force magnet 40) toward the opposing surface 30*a* of the flange part 32*a*.

As illustrated in the magnetic pole part 33 on the left side of FIG. 4, the second cavity part 62 is formed so that a distance D between the variable magnetic-force magnet 50 and the second cavity part 62 in the circumferential direction becomes larger as it approaches the opposing surface 30*a*, and is formed so that a circumferential width Wa of the second cavity part 62 becomes smaller as it separates from the fixed magnetic-force magnet 40 in the radial direction.

In detail, the second cavity part 62 has a part (radially extending part 62*a*) which is tapered from an end part of the fixed magnetic-force magnet 40 toward the opposing surface 30*a*, and a part (circumferentially extending part 62*b*) which is tapered from a base end part of the radially extending part 62*a* toward the variable magnetic-force magnet 50, and the axial cross-section is formed in an L-shape.

When seen in the axial direction, a side surface of the radially extending part 62*a* on the d-axis side is linear extending in the radial direction, and a radially-inward side surface of the circumferentially extending part 62*b* is linear extending in the circumferential direction. A side surface covering the q-axis side of the radially extending part 62*a* and radially outward of the circumferentially extending part 62*b* is curved bulging toward an end part of the fixed magnetic-force magnet 40.

A part of the end part 40*b* of the fixed magnetic-force magnet 40 (in detail, a radially outward part of the end surface of the fixed magnetic-force magnet 40) is exposed to the second cavity part 62, and is in contact with the second cavity part 62 directly. A part of the radially outward end surface of the second auxiliary fixed magnetic-force magnet 42 is also exposed to the second cavity part 62, and is in contact with the second cavity part 62 directly.

Therefore, a first closed area 37 is formed radially outward of the flange part 32*a* in each magnetic pole part 33, in which both sides in the circumferential direction and radially inward are defined by the two second cavity parts 62 and the magnetic pole surface PF of the fixed magnetic-force magnet 40. The first auxiliary fixed magnetic-force magnet 41 is disposed in the first closed area 37 in a state where both ends are close to the radially extending parts 62*a*. A circumferential width Wb between each end part of the first auxiliary fixed magnetic-force magnet 41 and each side surface of the radially extending part 62*a* on the d-axis side is the same.

The first variable magnetic-force magnet 51 is disposed at a position distant from the second cavity part 62, and the second variable magnetic-force magnet 52 is disposed so that it extends from a tip-end part of the circumferentially extending part 62*b* toward the opposing surface 30*a*.

In detail, a radially inward end part 52*a* of the second variable magnetic-force magnet 52 is exposed to the tip-end part of the circumferentially extending part 62*b*, and is in contact with the second cavity part 62 directly. Therefore, on the opposing surface 30*a* side of the flange part 32*a* in each magnetic pole part 33, two second closed areas 38 in which both sides in the circumferential direction and radially inward are defined by the second cavity part 62 and the magnetic pole surface PF of the second variable magnetic-force magnet 52 are formed.

<Devices for Various Operation Scenes of Drive Motor>

As described above, the stable output in the wide operating range is required for the drive motor 2. Further, from the viewpoint of the improvement in the fuel efficiency, the optimization of the power factor is required in the wide operating range. In addition, in the case of the variable magnetic-force motor, magnetizations of which the magnetizing direction is opposite, such as magnetization and demagnetization, are performed.

Therefore, in order to realize the increased output and improved efficiency of the drive motor 2, it is necessary to optimize the flow of magnetic flux according to the various operation scenes. The above-described structure of the rotor 30 is devised to meet the demand.

(Device for the Magnetizing Scene)

As described above, the large current which can be supplied to the drive motor 2 is limited. Therefore, the variable magnetic-force magnet 50 is preferred to be efficiently magnetizable until the magnetic force reaches saturation under such limitation. However, such magnetizing is difficult only by disposing the fixed magnetic-force magnet 40 and the variable magnetic-force magnet 50 at their fundamental positions.

Figure 5:
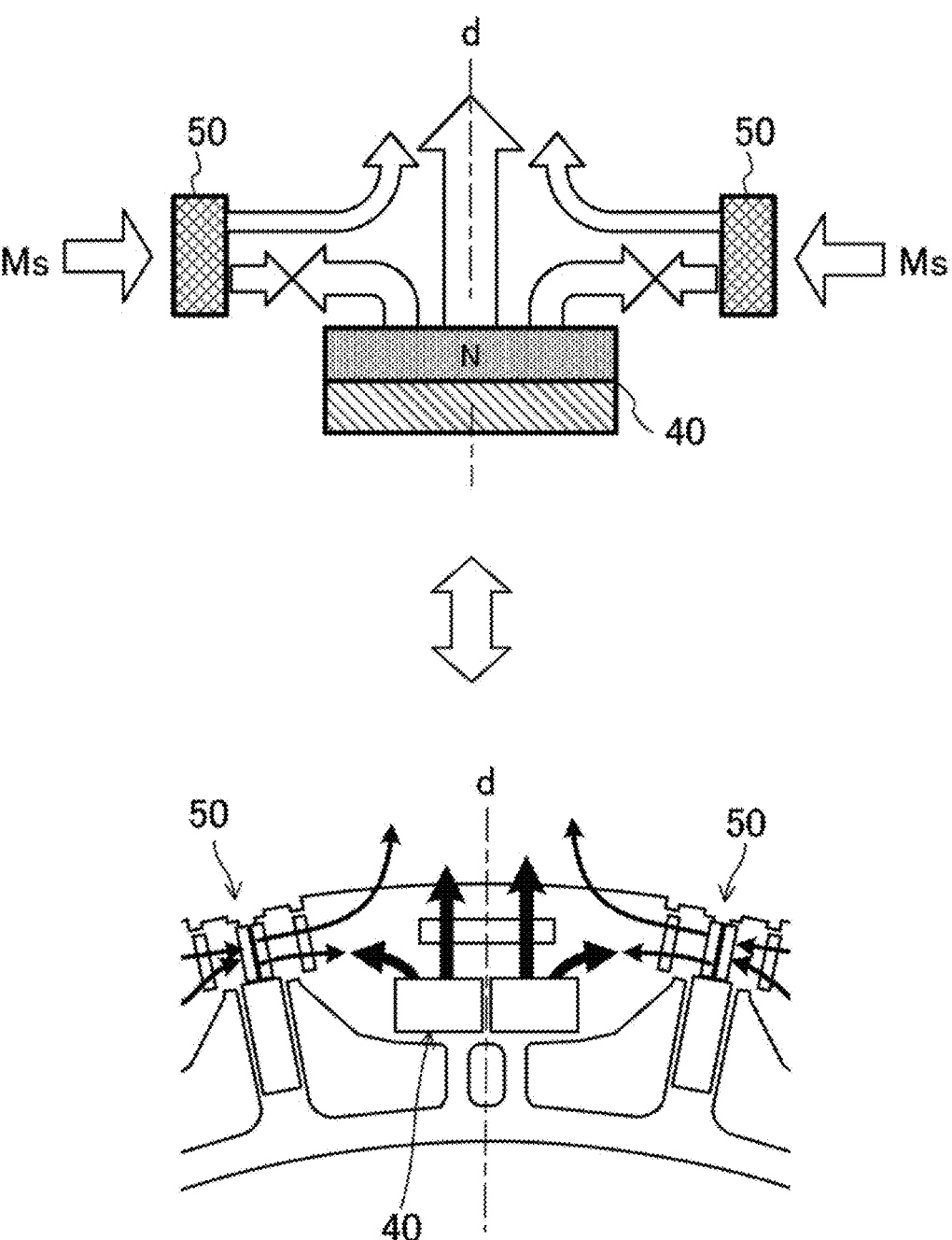
FIG. 5 is a view illustrating a devise for a magnetizing scene (comparative example).

FIG. 5 illustrates such a structure of the rotor 30 as a comparative example. The upper figure is a schematic diagram and the lower figure is a view in which this configuration is applied to the rotor 30 of this embodiment. When magnetizing, the variable magnetic-force magnet 50 is magnetized by making a strong magnetic force (magnetic field) act from radially outward toward the d-axis, as illustrated by an arrow Ms.

From the magnetic pole surface PF (N-pole) which is radially outward part of the fixed magnetic-force magnet 40, a high-density magnetic flux flows radially outward. Since a part of its magnetic flux and the magnetic flux which magnetizes the variable magnetic-force magnet 50 repel each other, the density of the magnetic flux which magnetizes the variable magnetic-force magnet 50 is reduced. As a result, the variable magnetic-force magnet 50 cannot be magnetized efficiently.

Figure 6:
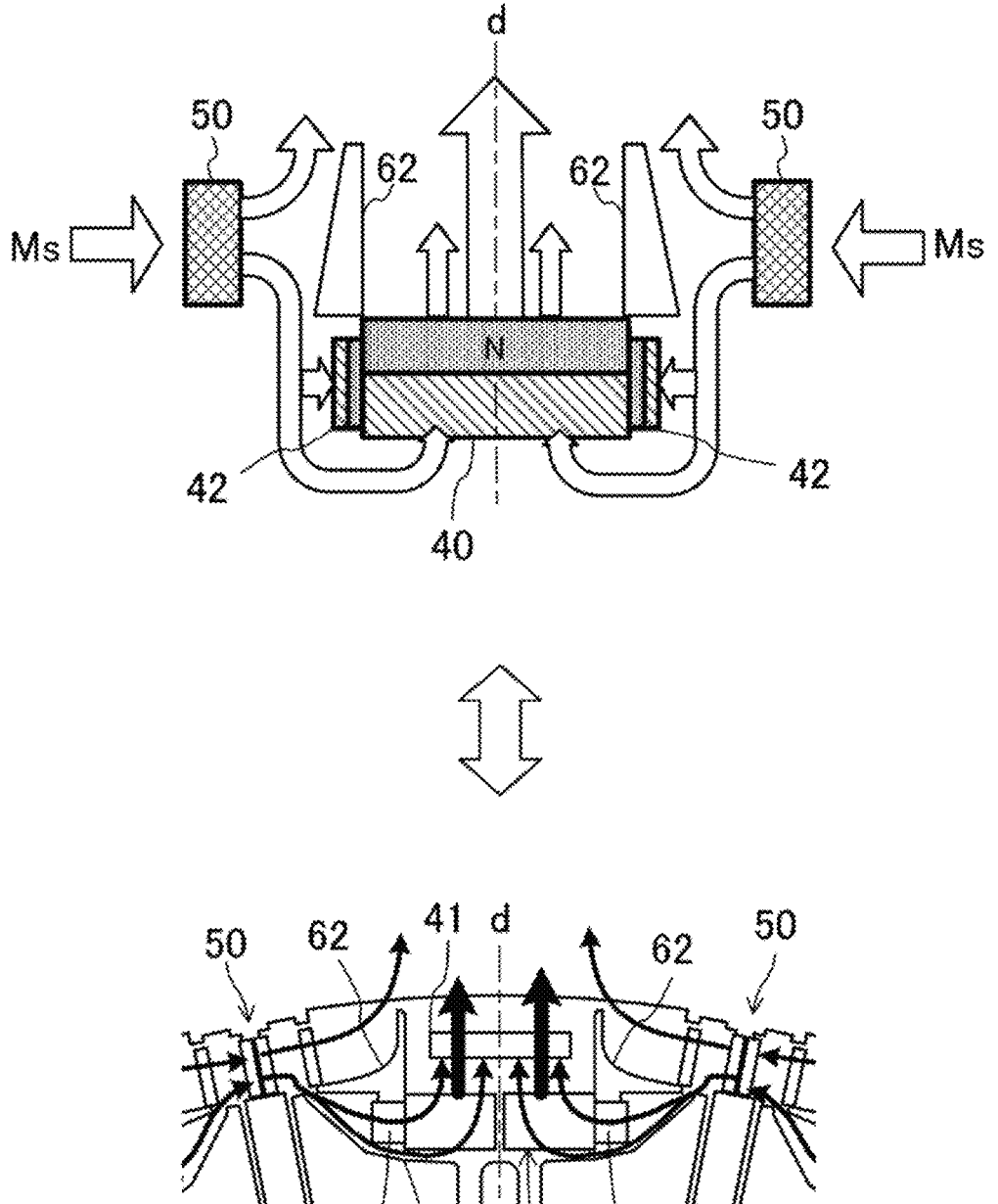
FIG. 6 is a view illustrating a devise for a magnetizing scene (embodiment).

FIG. 6 illustrates the structure of the rotor 30 of this embodiment which is indicated corresponding to FIG. 5. The magnetic reluctance of air is overwhelmingly high compared with the magnetic reluctance of the stator core 11. Therefore, the mutually-repelling magnetic paths are intercepted by providing the second cavity part 62. The magnetic flux has a characteristic to flow by the shortest distance. Therefore, a flow of the magnetic flux in the forward direction from the variable magnetic-force magnet 50 toward the S-pole of the fixed magnetic-force magnet 40 is formed.

Further, in the case of this rotor 30, the flow of the magnetic flux is guided by the curved surface 61*a* of the first cavity part 61. Moreover, the flow of the magnetic flux is promoted by the second auxiliary fixed magnetic-force magnet 42. As a result, the variable magnetic-force magnet 50 can be magnetized efficiently until the magnetic force reaches saturation, even under the limited condition.

(Device for Demagnetizing Scene and High Power-Factor Operation Scene)

In demagnetization, the variable magnetic-force magnet 50 can be demagnetized with a flux density lower than in magnetizing until the magnetic force reaches saturation. However, in demagnetization, the variable magnetic-force magnet 50 is magnetized from the opposite direction from the magnetizing direction (i.e., from the d-axis side).

Therefore, the magnetic field which acts on the variable magnetic-force magnet 50 in demagnetization is substantially the same as the magnetic field which acts in the magnetic-field weakening control, except the difference in the flux density. In detail, in an operation scene where the drive motor 2 is driven in an operating range with middle load to low load and high speed (high power-factor operation scene), for example, at an operation point P1 in FIG. 2 (passing acceleration, etc.), continuous high output at middle speed is required.

At this time, in the drive motor 2, the magnetic-field weakening control is performed so that the magnetic fluxes which collide at the d-axis between the rotor 30 and the stator 10 are canceled out. As a result, in the high power-factor operation scene, the magnetic field in the demagnetizing direction acts on the variable magnetic-force magnet 50 in association with the magnetic-field weakening control.

On the other hand, at an operation point P2 (high-speed cruising, etc.) in FIG. 2, demagnetization is performed when transitioning to the low-load side. In demagnetization, it is necessary to make the strong magnetic field act on the variable magnetic-force magnet 50. Note that when transitioning to the high-load side at the operation point P2, magnetizing as described above is performed.

Figure 7:
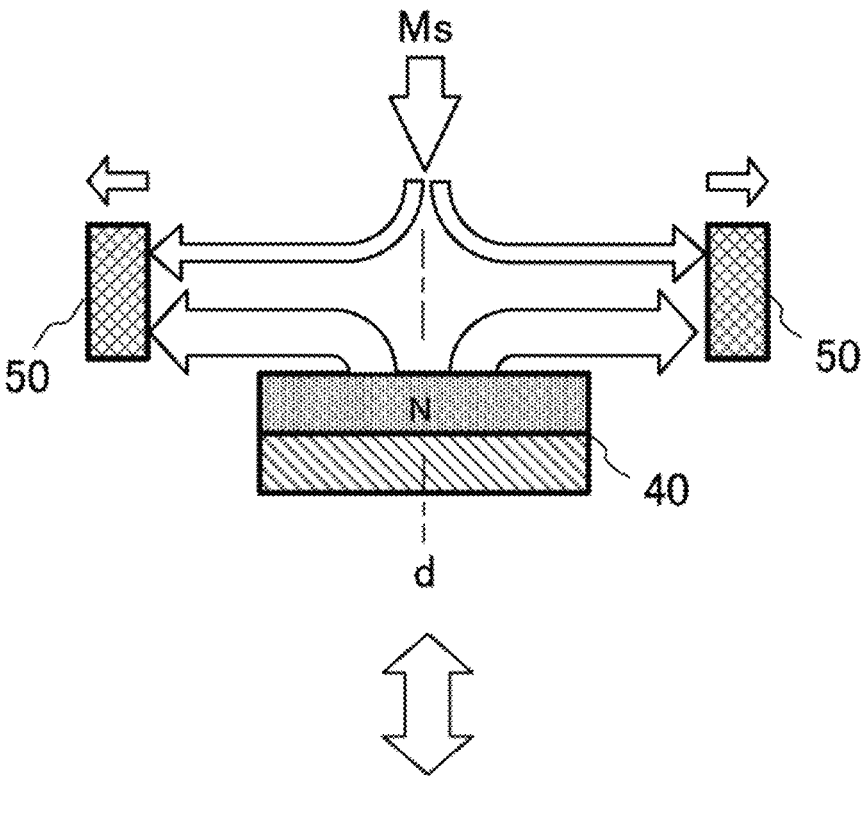
FIG. 7 is a view illustrating a devise for a demagnetizing scene and a high power-factor operation scene.
Figure 7:
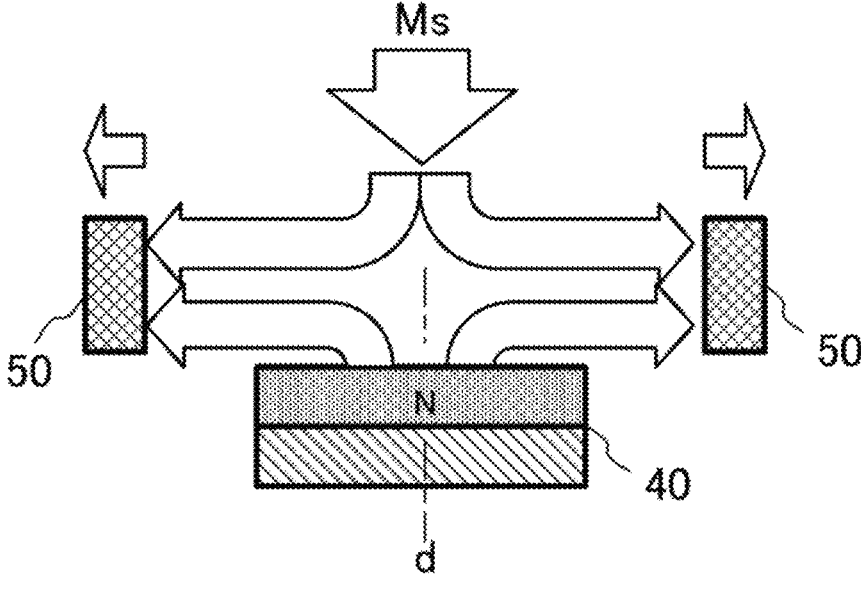

FIG. 7 schematically illustrates the fundamental structure of the rotor 30 in each of a high power-factor operation scene and a demagnetizing scene. The upper figure illustrates the high power-factor operation scene, and the lower figure illustrates the demagnetizing scene.

As illustrated by the arrow Ms, from the stator 10 toward the magnetic pole part 33 of the rotor 30, a weak magnetic flux is applied in the high power-factor operation scene, and a strong magnetic flux is applied in the demagnetizing scene. Each of these magnetic fluxes repels the magnetic flux which goes from the fixed magnetic-force magnet 40 side to the stator 10, and a part thereof goes toward the variable magnetic-force magnets 50 on both sides.

Therefore, in the demagnetizing scene, since the variable magnetic-force magnet 50 can be magnetized by both the amount of magnetic flux, demagnetizing can be performed with large current smaller than magnetizing. Therefore, in the demagnetizing scene, it is preferred to make these magnetic fluxes go toward the variable magnetic-force magnet 50.

On the other hand, in the high power-factor operation scene, if a part of the magnetic flux is deflected toward the variable magnetic-force magnet 50, the stable cancellation of the magnetic fluxes becomes difficult. Further, the variable magnetic-force magnet 50 may unnecessarily be demagnetized. Therefore, in the high power-factor operation scene, it is preferred to suppress the deflection of the magnetic flux toward the variable magnetic-force magnet 50, unlike in the demagnetizing scene.

In this regard, this drive motor 2 is provided with a magnetic flux obstructing structure which obstructs gradually or stepwisely the magnetic path of the magnetic flux which is repelled from the fixed magnetic-force magnet 40 side and goes toward the variable magnetic-force magnet 50 (repelled magnetic flux). In detail, the second closed area 38 constitutes the magnetic flux obstructing structure.

The magnetic reluctance of the magnetic body which constitutes the magnet is almost the same as the magnetic reluctance of the air. These magnetic reluctances are overwhelmingly high compared with the magnetic reluctance of the stator core 11. Therefore, both the second cavity part 62 and the second variable magnetic-force magnet 52 have the equivalent magnetic reluctance, and obstruct the flow of magnetic flux.

Figure 8:
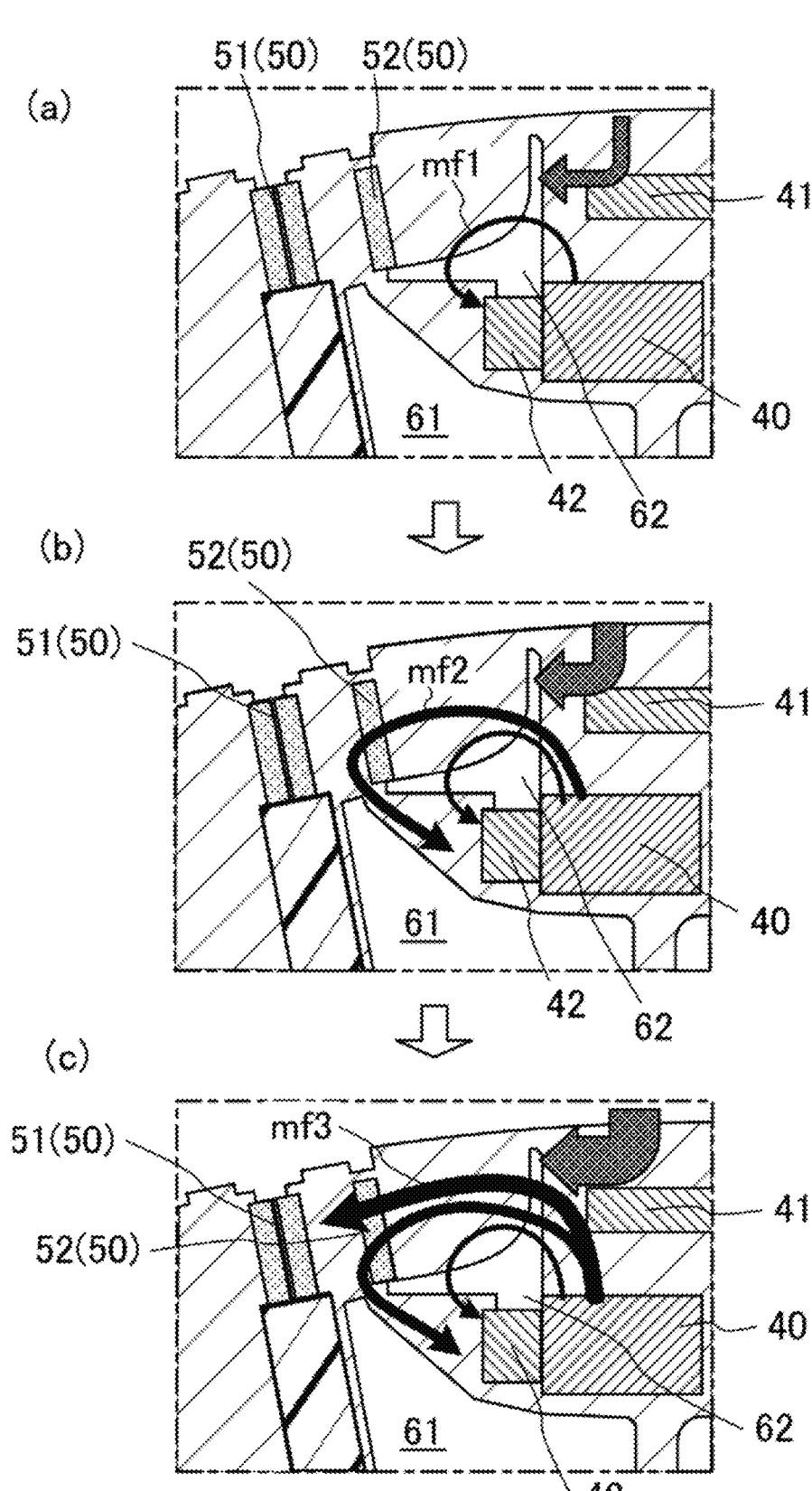
FIG. 8 is a view illustrating a function of a magnetic flux obstructing structure.

Referring to FIG. 8, a function of the magnetic flux obstructing structure is described. As illustrated in (a) of FIG. 8, when the amount of magnetic flux on the stator 10 side is small, the amount of magnetic flux which is repelled and goes from the fixed magnetic-force magnet 40 toward the variable magnetic-force magnet 50 is also small. In addition, most of the flow is obstructed by the second cavity part 62. Since the magnetic flux has the characteristic to flow by the shortest distance, the deflected magnetic flux returns to the fixed magnetic-force magnet 40 by a short-circuited magnetic path as illustrated by an arrow mf1.

As illustrated in (b) of FIG. 8, when the amount of magnetic flux on the stator 10 side increases, a part of the magnetic flux which goes from the fixed magnetic-force magnet 40 toward the variable magnetic-force magnet 50 penetrates the second cavity part 62, without being short-circuited, as illustrated by an arrow mf2, and it goes toward the variable magnetic-force magnet 50. However, this flow is obstructed by the second variable magnetic-force magnet 52. This magnetic flux returns to the fixed magnetic-force magnet 40 by the short-circuited magnetic path.

Further, as illustrated in (c) of FIG. 8, when the amount of magnetic flux on the stator 10 side further increases, a part of the magnetic flux which goes from the fixed magnetic-force magnet 40 toward the variable magnetic-force magnet 50 penetrates the second cavity part 62 and the second variable magnetic-force magnet 52, and flows toward the first variable magnetic-force magnet 51, as illustrated by an arrow mf3. Therefore, it becomes possible to demagnetize both the second variable magnetic-force magnet 52 and the first variable magnetic-force magnet 51. As a result, the contradictory demand of the demagnetizing scene and the high power-factor operation scene can be realized.

(Device for High-Torque Operation Scene)

The drive motor 2 is required for the high-torque but low-speed output. For example, at an operation point P3 in FIG. 2 (slope start, etc.), output at high torque is required. In this case, the output cannot be achieved only by increasing the magnetic force of the variable magnetic-force magnet 50 to a saturation magnetic force.

In this regard, this drive motor 2 is devised so that it can operate appropriately also in the high-torque operation scene by effectively utilizing both the magnet torque and the reluctance torque.

<Device for Strength of Rotor>

As described above, by devising the structure of the rotor 30, an increase in the output of the drive motor 2, an improvement in the efficiency, etc. are realized. However, as a result, the number of components (rotor elements), such as the fixed magnetic-force magnet 40, the variable magnetic-force magnet 50, and the cavity part, increases, and therefore, the structure of the rotor 30, such as the layout and the shape, becomes complicated.

These rotor elements are unevenly distributed in the outer circumferential part of the rotor 30. Therefore, the percentage of the rotor core 32 which is used as the base structure decreases in the outer circumferential part of the rotor 30, which is disadvantageous with respect to the strength. Meanwhile, when the rotor 30 rotates, a strong centrifugal force acts on the outer circumferential part of the rotor 30. Therefore, it is necessary for the rotor 30 to secure sufficient strength so that a centrifugal force breakage does not occur.

Thus, in this rotor 30, the structure of the rotor core 32 is devised so that both an improvement in the function and the necessarily sufficient strength are achieved. Hereinafter, the device is described.

(Structure of Rotor Core)

Figure 9:
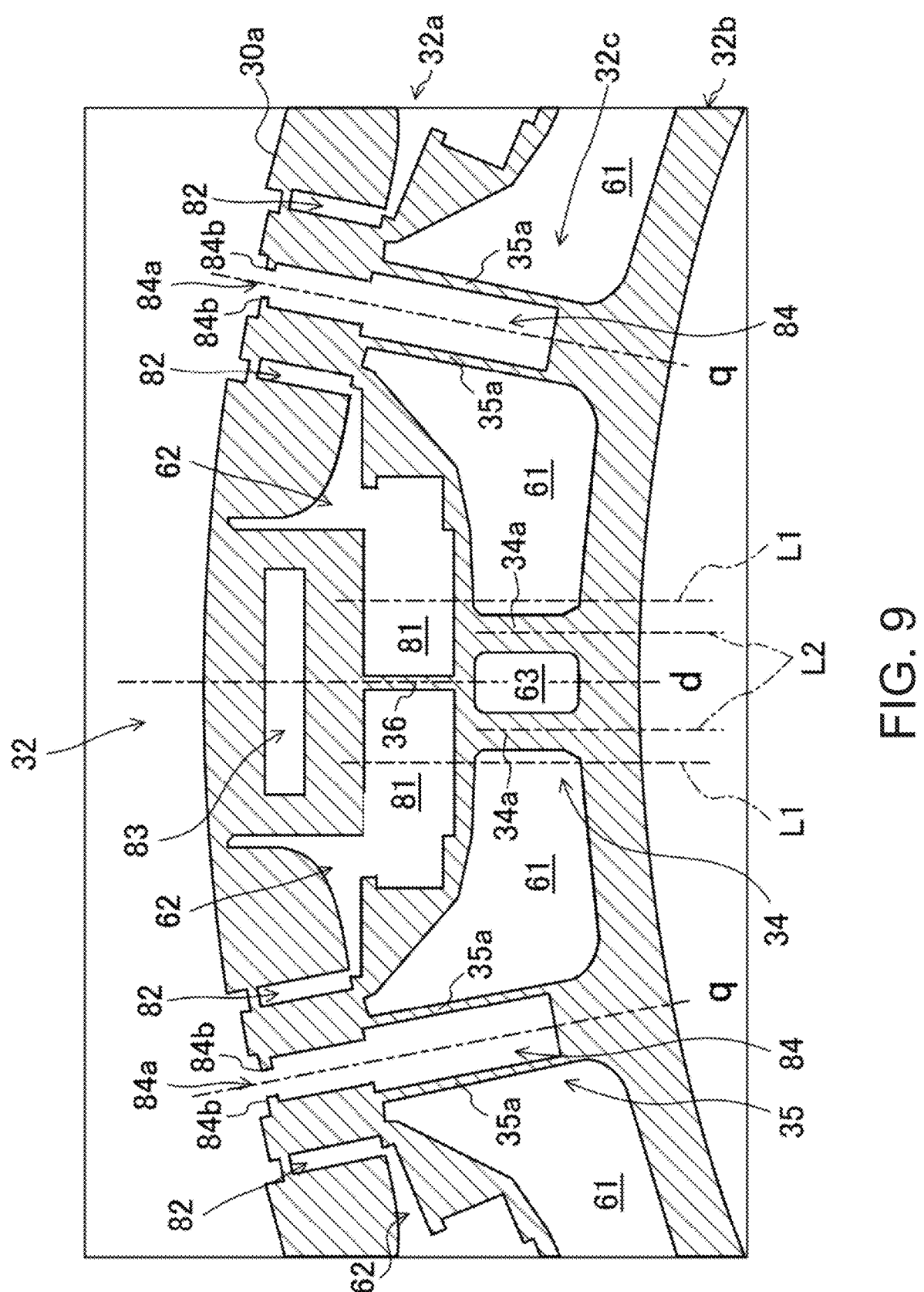
FIG. 9 is a view illustrating a cross-sectional structure of a rotor core.

FIG. 9 illustrates a cross-sectional structure of the rotor core 32 (magnetic pole part 33) when seen in the axial direction. In the rotor core 32, the first cavity part 61, the second cavity part 62, and the third cavity part 63 which are described above, and a first accommodating part 81, a second accommodating part 82, a third accommodating part 83, and a fourth accommodating part 84 are formed. These components are each formed in line symmetry with respect to the d-axis.

The first accommodating part 81 is a space where the fixed magnetic-force magnet 40 and the second auxiliary fixed magnetic-force magnet 42 are accommodated. The inner circumferential surface thereof is formed in the shape and the size such that these magnets are inserted without any cavity. An end part of the first accommodating part 81 distant from the d-axis and radially outward continues to the second cavity part 62, and therefore, these parts are integrated. The center part of the circumferential width of the first accommodating part 81 is bisected by the inside coupling part 36.

The second accommodating part 82 is a space where the second variable magnetic-force magnet 52 is accommodated. An inner circumferential surface thereof is formed in the shape and the size such that the magnet is inserted without any cavity. A radially-inward end part of the second accommodating part 82 continues to the second cavity part 62 at a part on the d-axis side, and therefore, these parts are integrated.

The third accommodating part 83 is a space where the first auxiliary fixed magnetic-force magnet 41 is accommodated. An inner circumferential surface thereof is formed in the shape and the size such that the magnet is inserted without any cavity.

The fourth accommodating part 84 is a space where the first variable magnetic-force magnet 51 and the synthetic resin 70 are accommodated. An inner circumferential surface thereof is formed in the shape and the size such that these are inserted without any cavity. A slit-like notch 84a which opens in the outer circumferential surface of the rotor core 32 is formed in a radially-outward part of the fourth accommodating part 84. The notch 84a extends throughout the rotor core 32 in the axial direction, and divides the outer circumferential surface of the rotor core 32.

A pair of regulating protrusions 84b which extend in the axial direction along the edge of the notch 84a are provided on both sides of the notch 84a in the circumferential direction. These regulating protrusions 84b protrude toward the q-axis, and they oppose to each other on both sides of the q-axis.

(Device of Structure of Rotor Core)

The first accommodating part 81 is bisected, and the center part of the circumferential width is coupled by the inside coupling part 36 which extends in the radial direction.

Figure 10:
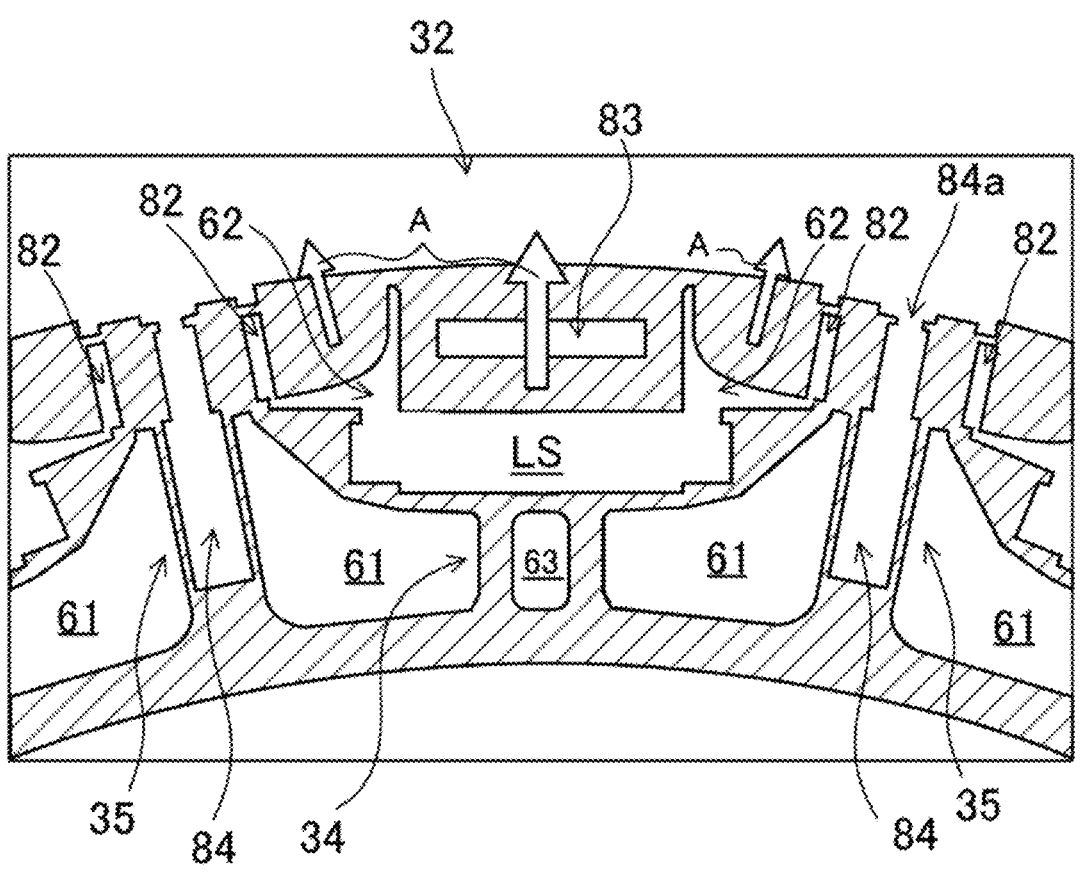
FIG. 10 is a view illustrating devising of the structure of the rotor core.

Functionally, the number of magnet pieces 40a may be one (i.e., the fixed magnetic-force magnet 40 is not divided into pieces), and this is preferred also from the viewpoint of the number of components. However, if the number of magnet pieces 40a is one, the first accommodating part 81 becomes long in the circumferential direction. Further, the first accommodating part 81 is formed integrally with the second cavity part 62 and the second accommodating part 82. That is, if the number of magnet pieces 40a is one, a space which continues long in the circumferential direction is formed, as illustrated by a reference character "LS" in FIG. 10.

Therefore, when the rotor 30 rotates and a radially outward load is applied to the fixed magnetic-force magnet 40, the first accommodating part 81, the second cavity part 62, and the second accommodating part 82 are deformed, and the flange part 32a is expanded easily as illustrated by arrows A. Therefore, it may cause a centrifugal force breakage of the flange part 32a.

On the other hand, as illustrated in FIG. 9, by connecting the center part of the circumferential width of the first accommodating part 81 with the inside coupling part 36, the space which is long in the circumferential direction can be bisected, and the load which acts on the fixed magnetic-force magnet 40 can be distributed. Therefore, from the viewpoint of functionality, even when the fixed magnetic-force magnet 40, the second auxiliary fixed magnetic-force magnet 42, the second cavity part 62, and the second variable magnetic-force magnet 52 are arranged in such a layout, sufficient strength of the flange part 32a can be secured.

Further, when the rotor 30 rotates, the radially outward load applied to the part (magnetic pole substantial part) of the flange part 32a where the fixed magnetic-force magnet 40, etc. are disposed is mainly received by the first pillar part 34. The first pillar part 34 is comprised of a plurality of outside coupling parts 34a disposed at given positions.

That is, the first pillar parts 34 is constituted by the plurality of outside coupling parts 34a, and the plurality of outside coupling parts 34a are disposed so that they are located circumferentially inward of the center position of the circumferential width of each half of the bisected fixed magnetic-force magnet 40.

Further, when the first pillar part 34 is constituted by two outside coupling parts 34a like in the rotor 30 of this embodiment, it is preferred that the center position of the circumferential width of each outside coupling part 34a is located on the d-axis side of the center position of the circumferential width of each magnet piece 40a. Thus, the two outside coupling parts 34a correspond to the bisected fixed magnetic-force magnet 40 so that the effects by the first pillar parts 34 become more appropriate.

In detail, the center position of the circumferential width of each magnet piece 40a is illustrated by a one-dot chain line L1 in FIG. 9. The outside coupling parts 34a are disposed so that they are located between these one-dot chain lines L1. The center position of the circumferential width of each outside coupling part 34a is illustrated by a one-dot chain line L2 in FIG. 9. These one-dot chain lines L2 are located on the d-axis side of the one-dot chain line L1. Note that the number of outside coupling parts 34a may also be 3 or 4, without being limited to 2.

From the viewpoint of the strength, it is preferred that the circumferential width of the first pillar parts 34 is widened. However, then the cavity area decreases, and the rotor 30 becomes heavier. Since the first pillar part 34 connects the flange part 32a to the base part 32b, it also functions as a magnetic path of the fixed magnetic-force magnet 40. That is, the width of the first pillar part 34 influences the strength, and it also influences the flow of magnetic flux.

In detail, if the first pillar part 34 is too narrow, the magnetic flux generated by the fixed magnetic-force magnet 40 is reduced because of the influence of the magnetic saturation of the first pillar part 34, but the magnetic field from the stator 10 acts easily on the variable magnetic-force magnet 50. If the first pillar part 34 is too wide, the magnetic flux generated by the fixed magnetic-force magnet 40 is increased until the magnetic saturation of the first pillar part 34 is canceled, but it becomes difficult for the magnetic field from the stator 10 to act on the variable magnetic-force magnet 50. Therefore, a suitable circumferential width of the first pillar part 34 is determined by the magnetic flux flow. Therefore, the first pillar part 34 is comprised of the plurality of outside coupling parts 34a which are suitably adjusted in the width.

The magnetic flux of the fixed magnetic-force magnet 40 is stronger on the center side of the d-axis. Therefore, if the outside coupling part 34a is disposed at a position distant from the d-axis, the smooth flow of the magnetic flux of the fixed magnetic-force magnet 40 is obstructed, and thus, the function as a magnetic path is reduced.

The fixed magnetic-force magnet 40 is bisected centering on the d-axis into the two magnet pieces 40a. Therefore, since the magnetic flux of the fixed magnetic-force magnet 40 also flows out or flows in from each of the magnet pieces 40a, the magnetic path is more preferred to be located at a position which is eccentric to both sides of the d-axis rather than the center of the d-axis.

Thus, as described above, the outside coupling parts 34a are disposed. As a result, since the magnetic flux of the fixed magnetic-force magnet 40 flows easily into the outside coupling parts 34a, the function as the magnetic path of the first pillar parts 34 can be secured.

The inside coupling part 36 is provided in the center part of the circumferential width of the fixed magnetic-force magnet 40. Therefore, the first pillar parts 34 receive most of the load applied to the inside coupling part 36. On the other hand, since the outside coupling parts 34a are disposed at the positions which are spread in the circumferential direction from the inside coupling part 36, they can distributively receive the load substantially equally. Therefore, even when the width of each outside coupling part 34a is narrow, it can receive the load applied to the inside coupling part 36.

As described above, even if the width of each outside coupling part 34a is narrow, the width may be suitable as a whole. Therefore, by constituting the first pillar parts 34 as described above, both the magnetic path of the fixed magnetic-force magnet 40 and the sufficient strength can be secured.

Further, in this rotor core 32, the second pillar part 35 which couples the flange part 32a to the base part 32b is provided to the part of the q-axis where the variable magnetic-force magnet 50 is disposed.

If the large cavity is formed in the part of the rotor core 32 radially inward of the flange part 32a on the q-axis, the strength will be insufficient and easily cause the centrifugal force breakage. On the other hand, in this rotor core 32, since the second pillar part 35 which couples the flange part 32a to the base part 32b is also provided to the part of the q-axis, the strength of the rotor core 32 can be secured.

However, the notch 84a which divides the outer circumferential surface 30a of the rotor core 32 is formed in the radially outward part of the rotor core 32 part on the q-axis. Therefore, if this part is deformed largely and the notch 84a expands, the first variable magnetic-force magnet 51 may eject therefrom.

On the other hand, in this rotor 30, the first variable magnetic-force magnet 51 is comprised of the two magnetic material pieces 53. The radially-outward ejection of each magnetic material piece 53 is regulated by the regulating protrusions 84b which are provided on both sides of the notch 84a.

The circumferential width of the second pillar part 35 is wider than the first variable magnetic-force magnet 51. In addition, by including the synthetic resin 70 in the part of the second pillar part 35, which is radially inward of the first variable magnetic-force magnet 51, the pair of coupling arm parts 35a located radially outward of the first variable magnetic-force magnet 51 are formed on both sides of the synthetic resin 70.

Each coupling arm part 35a collaborates with the first pillar parts 34 to receive from circumferentially outward the load applied to the magnetic pole substantial part. Therefore, since the load can be distributed effectively, the strength of the rotor 30 can be improved structurally. Each coupling arm part 35a constitutes the magnetic path. Therefore, the second pillar part 35 also functions as the magnetic path which connects the flange part 32a to the base part 32b.

Further, the synthetic resin 70 with the wider circumferential width than the first variable magnetic-force magnet 51 is disposed radially inward of the first variable magnetic-force magnet 51. Therefore, when the centrifugal force acts, the load on the synthetic resin 70 is applied to the two magnetic material pieces 53. Since the synthetic resin 70 is comparatively light in the weight, the load is small.

Therefore, the synthetic resin 70 pushes each magnetic material piece 53 against the regulating protrusion 84b with a moderate load. Therefore, ejection of the two magnetic material pieces 53 caught by the regulating protrusions 84b can be suppressed.

(Stress Distribution of Rotor Core)

Figure 11:
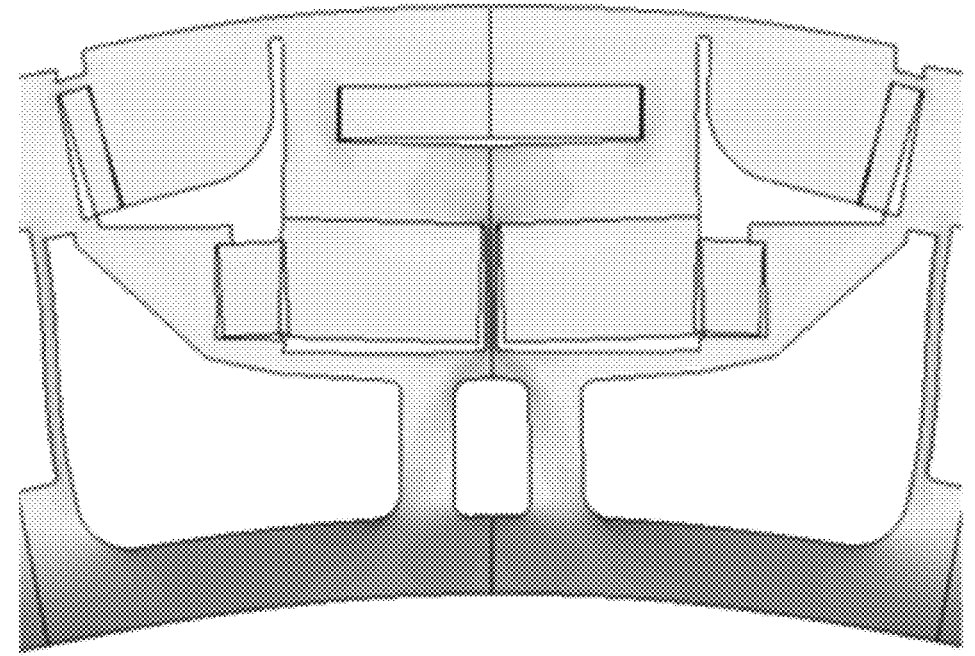
FIG. 11 is a view illustrating one example of an analysis result of a stress distribution of the rotor core.

FIG. 11 illustrates an analysis result of a stress distribution of the rotor core 32 when making a centrifugal force acting thereon excessive. In this drawing, a darker part indicates a larger stress.

In FIG. 11, it can be seen that a large stress acts on the inside coupling part 36 and this stress is distributed to the two outside coupling parts 34a.

Note that the disclosed art is not limited to the above embodiment, but it also includes various other configurations. For example, although in the above embodiment the hybrid vehicle is illustrated, it may be an electric vehicle which travels or is propelled only by the drive motor 2. Although the rotor core 32 is fixed to the shaft 20 via the hub 21, it may be fixed to the shaft 20 directly without the hub 21.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Automobile
2 Drive Motor
3 Engine
10 Stator
30 Rotor
32 Rotor Core
32a Flange Part
32b Base Part
32c Connecting Part
33 Magnetic Pole Part
34 First Pillar Part
34a Outside Coupling Part
35 Second Pillar Part
35a Coupling Arm Part
36 Inside Coupling Part
40 Fixed Magnetic-force Magnet
40a Magnet Piece
41 First Auxiliary Fixed Magnetic-force Magnet (Auxiliary Fixed Magnetic-force Magnet)
42 Second Auxiliary Fixed Magnetic-force Magnet
50 Variable Magnetic-force Magnet
51 First Variable Magnetic-force Magnet
52 Second Variable Magnetic-force Magnet
61 First Cavity Part
62 Second Cavity Part
63 Third Cavity Part
70 Synthetic Resin
81 First Accommodating Part
82 Second Accommodating Part
83 Third Accommodating Part
84 Fourth Accommodating Part
84a Notch
84b Regulating Protrusion
PF Magnetic Pole Surface
J Rotation Axis

What is claimed is:

1. A structure of a rotor that constitutes a drive motor and has a changeable magnetic force, the structure comprising:

a rotor core disposed inside a stator and opposing the stator via a given gap; and a plurality of magnetic pole parts disposed in the rotor core so that N-poles and S-poles are lined up alternately in a circumferential direction of the rotor core along an opposing surface, wherein the rotor core includes:

a flange part opposing the stator and having an annular shape in an axial cross-section;

a base part located inward of the flange part and separated from the flange part by a given distance; and a connecting part coupling the base part to the flange part, wherein each of the magnetic pole parts includes:

a fixed magnetic-force magnet elongated in the circumferential direction and disposed in the flange part centering on a d-axis so that a magnetic force thereof is oriented in a radial direction of the rotor core;

a variable magnetic-force magnet disposed in a part of the flange part on an opposing surface side of the fixed magnetic-force magnet, at a position adjacent in the circumferential direction to the fixed magnetic-force magnet so that a magnetic force thereof is oriented in the circumferential direction; and a cavity part defined by the connecting part, between the flange part and the base part, wherein the connecting part includes a first pillar part located radially inward of the fixed magnetic-force magnet, wherein, by bisecting the fixed magnetic-force magnet in line symmetry with respect to the d-axis into a pair of magnet pieces, a bar-shaped inside coupling part is provided in a part of the flange part, the part corresponding to a center part of a circumferential width of the fixed magnetic-force magnet, the inside coupling part having an axial cross-section extending in the radial direction, wherein the first pillar part is comprised of a plurality of outside coupling parts that bridge between the flange part and the base part and have a pillar-shape axial cross-section, and the outside coupling parts are disposed circumferentially inward of a center position of the circumferential width of each of the pair of magnet pieces, wherein the first pillar part is comprised of two outside coupling parts, and the center position of the circumferential width of each of the outside coupling parts is located on a d-axis side of the center position of the circumferential width of each of the pair of magnet pieces, wherein the variable magnetic-force magnet is disposed at a position centering on a q-axis, and wherein the connecting part includes a second pillar part having a pillar shape in the axial cross-section, and the second pillar part is located in a part radially-inward of the variable magnetic-force magnet and bridges between the flange part and the base part.

2. The structure of claim 1, wherein the second pillar part has a wider circumferential width than that of the variable magnetic-force magnet, and wherein by including a nonmagnetic material extending along the second pillar part in a part radially inward of the variable magnetic-force magnet, a pair of coupling arm parts having a bar shape in the axial cross-section are formed, the pair of coupling arm parts being located at both sides of the nonmagnetic material, circumferentially outward of the variable magnetic-force magnet.

3. A structure of a rotor that constitutes a drive motor and has a changeable magnetic force, the structure comprising:

a rotor core disposed inside a stator and opposing the stator via a given gap; and a plurality of magnetic pole parts disposed in the rotor core so that N-poles and S-poles are lined up alternately in a circumferential direction of the rotor core along an opposing surface, wherein the rotor core includes:

a flange part opposing the stator and having an annular shape in an axial cross-section;

a base part located inward of the flange part and separated from the flange part by a given distance; and a connecting part coupling the base part to the flange part, wherein each of the magnetic pole parts includes:

a fixed magnetic-force magnet elongated in the circumferential direction and disposed in the flange part centering on a d-axis so that a magnetic force thereof is oriented in a radial direction of the rotor core;

a variable magnetic-force magnet disposed in a part of the flange part on an opposing surface side of the fixed magnetic-force magnet, at a position adjacent in the circumferential direction to the fixed magnetic-force magnet so that a magnetic force thereof is oriented in the circumferential direction; and a cavity part defined by the connecting part, between the flange part and the base part, wherein the connecting part includes a first pillar part located radially inward of the fixed magnetic-force magnet, wherein, by bisecting the fixed magnetic-force magnet in line symmetry with respect to the d-axis into a pair of magnet pieces, a bar-shaped inside coupling part is provided in a part of the flange part, the part corresponding to a center part of a circumferential width of the fixed magnetic-force magnet, the inside coupling part having an axial cross-section extending in the radial direction, wherein the first pillar part is comprised of a plurality of outside coupling parts that bridge between the flange part and the base part and have a pillar-shape axial cross-section, and the outside coupling parts are disposed circumferentially inward of a center position of the circumferential width of each of the pair of magnet pieces, wherein the variable magnetic-force magnet is disposed at a position centering on a q-axis, and wherein the connecting part includes a second pillar part having a pillar shape in the axial cross-section, the second pillar part is located in a part radially-inward of the variable magnetic-force magnet and bridges between the flange part and the base part.

4. The structure of claim 3, wherein the second pillar part has a wider circumferential width than that of the variable magnetic-force magnet, and wherein by including a nonmagnetic material extending along the second pillar part in a part radially inward of the variable magnetic-force magnet, a pair of coupling arm parts having a bar shape in the axial cross-section are formed, the pair of coupling arm parts being located at both sides of the nonmagnetic material, circumferentially outward of the variable magnetic-force magnet.

5. The structure of claim 3, wherein the cavity part is formed between the first pillar part and the second pillar part, both sides of the cavity part in the circumferential direction are defined by the first pillar part and the second pillar part, and a radially inward part of the cavity part is defined by the base part.

6. The structure of claim 5, wherein a radially-outward part of the cavity part is defined by a curved surface extending from a radially-outward end part of the first pillar part to a radially-outward end part of the second pillar part.

7. The structure of claim 3, wherein a radially-outward part of the cavity part is defined by a curved surface extending from a radially-outward end part of the first pillar part to a radially-outward end part of the second pillar part.

* * * * *